(12) United States Patent
Lam et al.

(10) Patent No.: US 8,732,311 B1
(45) Date of Patent: May 20, 2014

(54) NETWORK OBJECT DELIVERY SYSTEM FOR PERSONAL COMPUTING DEVICE

(75) Inventors: Barry Lam, Tao-Yuan Shien (TW); Ted Chang, Chia-Yi (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 12/786,274

(22) Filed: May 24, 2010

Related U.S. Application Data

(63) Continuation of application No. 09/967,897, filed on Sep. 28, 2001, now Pat. No. 7,725,554.

(51) Int. Cl.
*G06F 15/16* (2006.01)

(52) U.S. Cl.
USPC .......................... 709/226; 709/203; 709/217

(58) Field of Classification Search
USPC .......................... 709/202, 203, 205, 217–219
See application file for complete search history.

(56) References Cited

U.S. PATENT DOCUMENTS

| | | | |
|---|---|---|---|
| 5,247,497 A | 9/1993 | Cohn | |
| 5,483,654 A | 1/1996 | Staron et al. | |
| 5,950,010 A | 9/1999 | Hesse et al. | |
| 6,078,951 A | 6/2000 | Pashupathy et al. | |
| 6,134,582 A | 10/2000 | Kennedy | |
| 6,397,242 B1 * | 5/2002 | Devine et al. | 718/1 |
| 6,493,743 B2 | 12/2002 | Suzuki | |
| 6,523,166 B1 * | 2/2003 | Mishra et al. | 717/174 |
| 6,546,554 B1 | 4/2003 | Schmidt et al. | |
| 6,633,898 B1 | 10/2003 | Seguchi et al. | |
| 6,775,671 B1 | 8/2004 | de Lara et al. | |
| 8,122,344 B2 * | 2/2012 | Halahmi | 715/249 |
| 2002/0083058 A1 * | 6/2002 | Hsiao et al. | 707/9 |
| 2002/0174010 A1 * | 11/2002 | Rice, III | 705/14 |
| 2003/0023637 A1 * | 1/2003 | Halahmi | 707/523 |
| 2003/0065744 A1 | 4/2003 | Lam et al. | |

FOREIGN PATENT DOCUMENTS

| JP | 2000-172657 | 6/2000 |
|---|---|---|
| WO | 98/33129 | * 7/1998 |

* cited by examiner

*Primary Examiner* — David Lazaro
(74) *Attorney, Agent, or Firm* — TIPS Group

(57) ABSTRACT

A networked object delivery system for a personal computing device includes a network, a personal computing device at least part time coupled to the network, and a service agent server at least part time coupled to the network. The personal computing device is preferably a PDA or the like, but can also include personal computers, laptop computers, notebook computers, etc. The personal computing device locally operates on a requested document with at least one downloaded application module from the network. The service agent server will download a requested document and at least one application module to the personal computing device over the network in response to a request for the document and in response to a desired action to be performed on that document.

10 Claims, 17 Drawing Sheets

| Actions | Attributes | Application Modules |
|---|---|---|
| (1) | A | S1, S2 ... |
| | B | S3, S4, ... |
| | C | S1, S3, ... |
| (2) | A | S2, S4, ... |
| | B | S5, S6, ... |
| | C | S7... |
| (3) | A | . |
| | B | . |
| | C | . |

Application

FIG. 15

NETWORK OBJECT DELIVERY SYSTEM FOR PERSONAL COMPUTING DEVICE

CROSS REFERENCE TO RELATED APPLICATION

This application is a continuation of U.S. Ser. No. 09/967,897, filed Sep. 28, 2001 now U.S. Pat. No. 7,725,554, which is herein incorporated by reference.

BACKGROUND OF THE INVENTION

This invention relates generally to personal computing devices such as digital personal digital assistance (PDAs) and more particularly to personal computing devices at least part time coupled to a wide area network.

Over time, personal computing devices have evolved into a variety of subcategories. For example, the desktop computer is often used for day to day business and personal use. Laptop and notebook computers have the advantage of portability and have been increasingly used by mobile professionals. Personal digital assistance (PDAs) are sometimes referred to as palmtop computers and tend to have limited capabilities as far as computational speed, memory, etc. that is, they have evolved as special purpose devices having a limited repertoire of application programs such as calendaring, e-mail, contact information, etc.

There are two main categories of PDAs currently available. The first category of PDA is that which operates under the Palm™ operating system provided by Palm Computing, Inc. of Santa Clara, Calif. Examples of PDAs using the Palm OS include the Palm Palm Pilot PDA and the Visor PDA. The other category of PDAs are those that use the Window CE™ Operating System licensed by Microsoft Corporation of Redland, Wash. PDAs using the Windows CE Operating System are provided by a wide variety of vendors.

The basic functionality of PDAs is stored in their base operating system and typically provide a small suite of productivity applications including calendaring, to do lists. contact lists, etc. PDAs using the Palm OS or the Windows CE OS also enjoy the possibility of loading additional application programs for a variety of purposes. For example, there are specialized accounting programs which run on PDAs such as the Quicken Software package, a variety of games, etc. However, a major limitation of the personal digital assistant is that it can not run full-fledged application programs that are designed for personal computing platforms. For example, with a PDA running a Windows CE OS, it would not be possible because of limitations in the operating system, available memory, computing power. etc. to run Microsoft Office. In consequence, application programs which run on PDAs must be custom designed for that purpose. Furthermore, the functionality of PDA applications must be severely limited.

Another form of personal computing device which is enjoying a recent resurgence in popularity is the network computer for "Thin Client" computer. This network computer is a low-powered computer which obtains part of its functionality by being connected to a network. By "low-powered" it is not necessarily meant that the computer does not consume a lot of electrical power but, rather, that the capabilities of the central processing unit (CPU) may not be all that high, and the computer may not be provided with much random access memory (RAM) and, perhaps, not even with a permanent store such as a hard disk drive. With a network PC, application programs are often run on a server connected to the network computer by a wide area network such as the interne. Network computers can also download small programs knows as "applets" or the like which can run locally in random access memory on the network computer.

The problem sometimes encountered with network computing is that the operability of the network computer may be dependent upon the operability of the network system itself. For example, if the network system or remote server is experiencing problems or a loss in efficiency, this will affect the ability of the network computer to perform its desired tasks. Also, the use of downloadable applets or the like can be problematic in that it requires a secure connection to the server over the wide area network and because the applets can only run in the temporary store of the network computer.

SUMMARY OF THE INVENTION

The present invention provides a personal computing device such as a PDA which can run an application module that is just large enough to perform the desired operation on a document. This allows for highly sophisticated yet specific operations to be implemented on a PDA despite its relatively limited computing power and memory.

More particularly, a networked object delivery system for a personal computing device in accordance with the present invention includes a network, a personal computing device at least part time coupled to the network, and a service agent server at least part time coupled to the network. The personal computing device is preferably a PDA or the like, but can also include personal computers, laptop computers, notebook computers, etc. The personal computing device locally operates on a requested document with at least one downloaded application module from the network. The service agent server is capable of bi-directional communication with the personal computing device. The service agent server will download a requested document and at least one application module to the personal computing device over the network in response to a request for the document and in response to a desired action to be performed on that document.

A method for transferring objects over a network between a network server and a personal computing device includes receiving on a server over a network a request from a personal computing device for a requested document and a requested action to be performed on the document. Next, a determination is made of at least one application module that can be used to perform the requested action on a requested document. Next, the requested document and the at least one application module is sent to the personal computing device over the network. The method for transferring objects can optionally further include receiving over the network a user identification of a user of the personal computer system. This permits the server to retrieve personal information concerning the user based upon the user identification. The request may be made in the form of an alphanumeric string or can be designated from a list.

A personal computing device in accordance with the present invention includes a digital processor, non-volatile memory coupled to the digital processor and including a core operating system, a network communication port coupled to the digital processor which is operative to send a request to a network server for a requested document that was not locally stored on the personal computing device and an action to be performed on the document, and read/write memory coupled to the digital processor and including at least a portion of the requested document and at least one application module that was downloaded to the personal computing device to perform the action on the requested document. In one embodiment, the core operating system includes components which facilitate the uploading of documents processed by the personal computing device and the downloading of documents and application modules to the personal computing device. In another embodiment, an extension operating system works in conjunction with the core operating system to facilitate the uploading of requests by the personal computing device and the downloading of documents and application modules to the personal computing device. In another embodiment, one of the plurality of application modules includes an operating system emulator which can be used by at least one other of the application modules.

A method for performing action on a document on the personal computing device includes indicating a requested document and an action to be performed on the document, downloading over a network the requested document and at least one application module to perform the action, and performing the action on the requested document on the personal computing device using the at least one application module. The requested document in action can be requested in a variety of fashions including uploading a string which can be parsed to determine the identify of the document in the action or by selected the document and or the action from a list.

A service agent server includes a digital processor, a network communication port coupled to the digital processor, a heuristic database in communication with the digital processor, an application module store in communication with the digital processor, a document store in communication with the digital processor, heuristic code segments stored in memory accessible to the digital processor, and object transmission code segments stored in memory accessible to the digital processor. The network communication port is operative to receive a request for a requested document and an action to be performed on the document from a personal computing device coupled to the network. The heuristic database includes actions, attributes, and application module designations. The application module store provides a number of application modules which can be retrieved based upon their application module designation. The document store includes the documents of the users of the personal computing devices coupled to the network. The heuristic code segments perform heuristics which utilize the action, attributes, and application module designation information of the heuristic database to determine at least one application module that can be used to performed the desired action on the document. The object transmission code segment is operative to retrieve the at least one application module selected by the heuristic methodology and the requested document and transmitting them via the network communication port to the personal computing device. The service agent server may optionally include a personal preference database in communication with the digital processor which can be used to customize interaction with a particular user of the personal computing device.

An advantage of the present invention is that only the document and the portion of an application program required to perform a desired action needs to actually reside on the personal computing device. For example, if the desired action is "view" a first application module can be provided, and if the user later desires to perform the action "edit" a second application module can be downloaded. In this fashion, the limited memory and computational power of a PDA is not burdened with unnecessary application software code. Furthermore, a much wider variety of applications can be used to process and otherwise manipulate documents than would otherwise be possible if they were permanently stored on the PDA.

Another advantage of the present invention is that the computing is performed locally on the personal computer device rather than on a remote server on the network. This creates higher performance and higher reliability than, for example, network computer type applications.

In certain embodiments of the present invention personal information can be uploaded from the personal computing device to the service agent server which allows the interaction and downloading of objects to be customized for that individual. For example, by identifying the individual by a variety of methodologies the service agent server can provide the last used document automatically along with its associated application module. In this fashion, the user can use any one of a number of undifferentiated personal computing devices which become "personalized" for the user upon an identification of his or her identify.

These and other advantages of the present invention will become apparent to those skilled in the art upon a reading of the following description and a study of the figures of the drawings.

BRIEF DESCRIPTION OF THE PREFERRED EMBODIMENTS

FIG. 15 illustrates a heuristic database of actions, attributes, and software module designations used by the heuristic determination process of FIG. 9;

DETAILED DESCRIPTION OF THE PREFERRED EMBODIMENT

Figure 1:
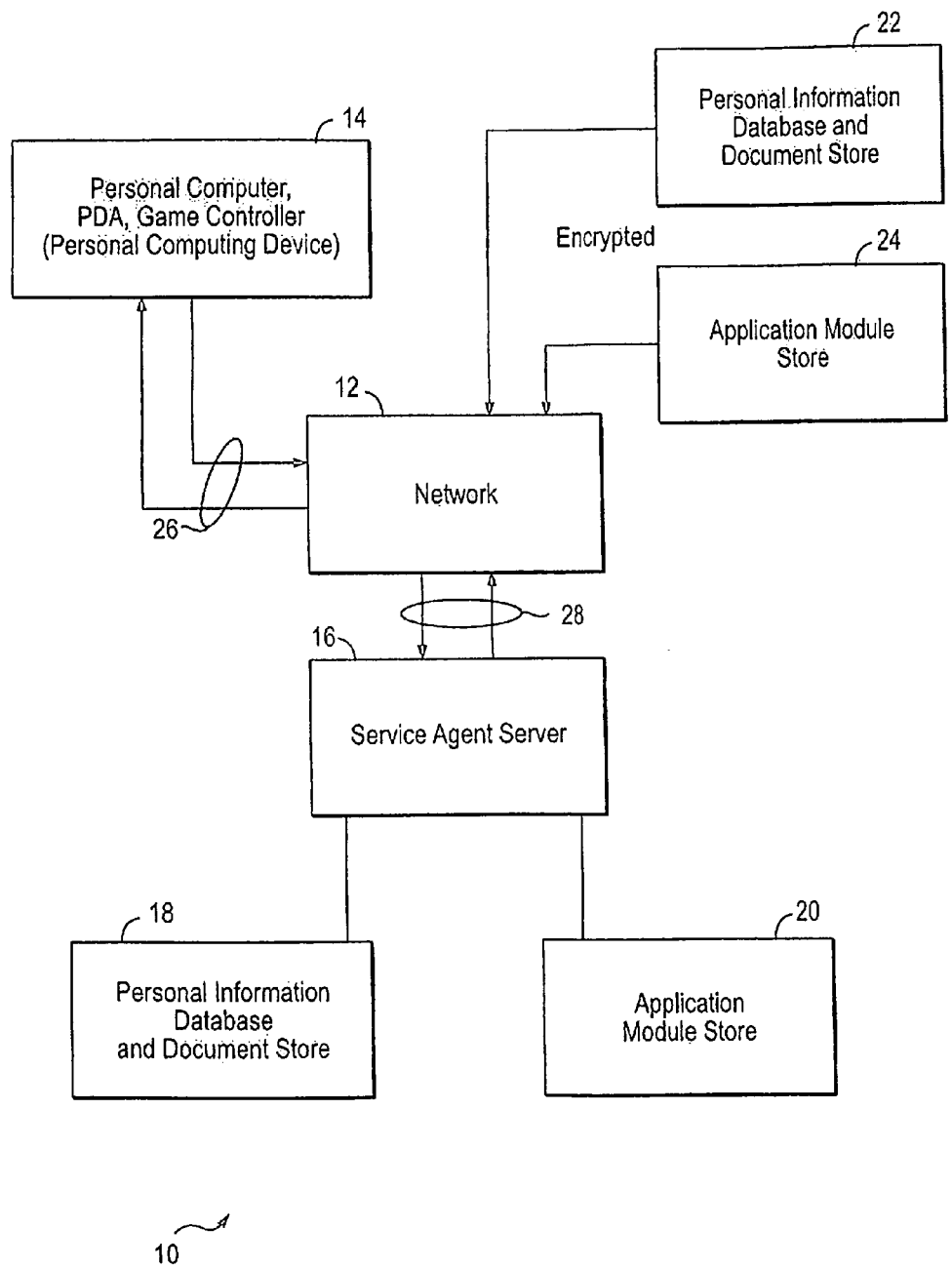
FIG. 1 is a block diagram of a network object delivery system for a personal computing device in accordance with the present invention.

FIG. 1 is a block diagram of a network object delivery system 10 in accordance with the present invention. The network object delivery system 10 includes a network 12, a personal computing device 14 which is at least part time coupled to the network, and a service agent server 16 which is also at least part time coupled to the network 12. The network object delivery system 10 can also include a personal information database and software store 18 coupled to the service agent server 16, an application module store 20 coupled to the service agent server 16. Optional data server 22 and software sources server 24 can also be coupled to the network 12, preferably with encrypted protocols.

The network 12 is preferably a wide area network (WAN) such as the Internet. As such, it preferably operates on the standard TCP/IP protocol. However, the network 12 can also include other wired or wireless types of WANs and local area networks (LANs). For example, the network 12 can be an intranet, a network operating on Microsoft NT protocols, a Novell protocol network, etc.

The personal computing device 14 can be any one of a wide variety of computing devices including a personal digital assistance (PDA), a personal computer, or a game controller. By "personal computing device" it is meant that it is a digital processing device that can be used by a user to perform personal functions for that user. While a preferred implementation of the present invention utilizes a PDA as the personal computing device, other embodiments of the present invention uses various forms of personal computer apparatus such as desktop computers, laptop computers, notebook computers, palmtop computers, etc. The personal computing device 14 is preferably at least part time coupled to the network 12 by a bi-directional interface 26. As will be appreciated by those skilled in the art, this bi-directional interface 26 can take a number of forms. For example, the personal computing device may be provided with a modem which connects to an internet service provider (ISP) through a standard telephone line. Alternatively, the bi-directional communication interface 26 can include a wireless interface to the network 12, a high-speed digital connection (such as an ISDN or DSL line), etc.

The service agent server 16 is also at least part time coupled to the network 12 by a bi-directional communication interface 28. In a preferred embodiment of the present invention the service agent server 16 is full time coupled to the network 12. For example, the service agent server can be co-located in a co-location facility, such as Exodus Communication Services for 24-7 connection to the Internet. This provides high-speed communication between the service agent server and the network such that the service agent server 16 can simultaneously service many personal computing devices 14 coupled to the network 12. Connected to the service agent server is a personal information database and document store 18 and an application module store 20. The personal information database 18 and the application module store 20 are illustrated to be connected directly to the service agent server 16, i.e. the data does not flow through the network 12. Alternatively, the personal information database and document store 22 and application module store 24 can communicate with the service agent server 16 through the network 12. Since a preferred embodiment or the present invention uses an open network protocol (i.e. the internet protocol) it is preferred that the personal information database 22 and software server 24 communicate with the service agent server 16 through encrypted transmission for security purposes.

It should be apparent to those skilled in the art that the functionality of the service agent server 16 and the various databases and stores 18-24 can be physically implemented in a number of fashions. For example, the service agent server databases 18 and 22 and the software stores 20 and/or 24 can be all implemented on a single computer. For example, the software product VM Ware permits a single computer to emulate a number of "ritual machines" each of which can communicate with each other as if they were separate devices. Alternatively, the computing and information storage can be distributed to a number of servers (including servers not shown in the example of FIG. 1) connected to each other and/or the network 12. It will therefore be appreciated that the exemplary block diagram of FIG. 1 is a functional representation of the networked object delivery system 10 rather than necessarily a physical representation.

Figure 2:
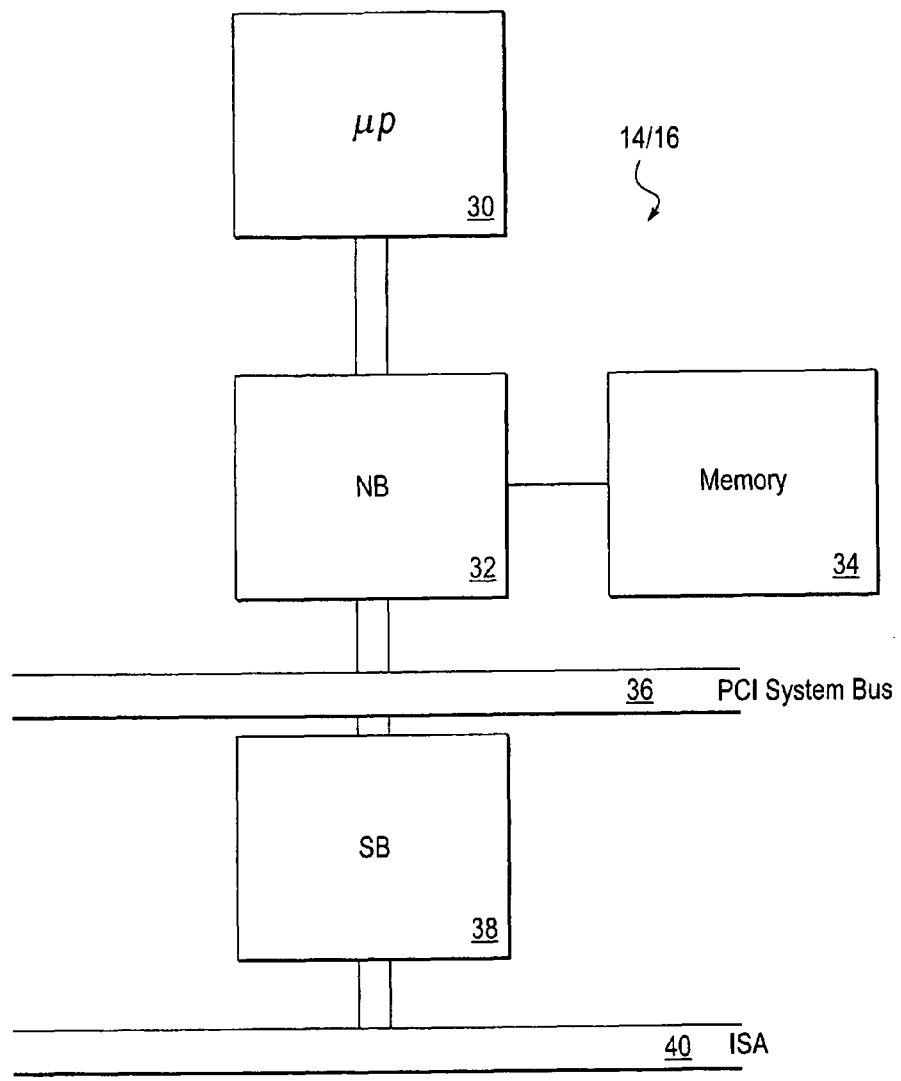
FIG. 2 is a block diagram of an exemplary architecture for a personal computing device or service agent server of the present invention.

FIG. 2 is a block diagram of a digital processor system which can be used for a personal computing device 14 or a service agent server 16, for example. The block diagram illustrates a standard Intel/IBM architecture structure and includes a microprocessor 30, a bridge 32, memory 34, a high-speed bus 36, a second bridge 38, and a low speed bus 40. The microprocessor 30 can be any one of a number of microprocessors, but when used for the service agent server a preferred microprocessor is an Intel or Intel compatible Pentium class microprocessor. The first bridge 32 is known as the North bridge when used with Intel and Intel compatible microprocessors 30 and serves the function of coupling the microprocessor 30 to the memory 34 and to the high speed bus 36. The memory 34 typically includes non-volatile memory such as read only memory (ROM) and ready/write memory such as dynamic random access memory (DRAM). The high-speed bus 36 can take a number of forms but is often made to meet the PCI standard protocols while known to those skilled in the art.

In Intel/IBM type architecture there is often a second or slow speed bus 40, e.g. an ISA bus. The slow speed bus is coupled to the high-speed bus 36 by a second bridge 38, such as the South bridge in the Intel/IBM architectures. In simpler computer designs there may be simply one bus, e.g. a high-speed bus 36, provided instead of multiple buses as illustrated in FIG. 2. The multiple bus structure is designed to make the computer system backward compatible with earlier versions of the computer system. Further, it will be appreciated by those skilled in the art that other computer architectures are also applicable for use for the personal computing device and the service agent server.

Figure 3:
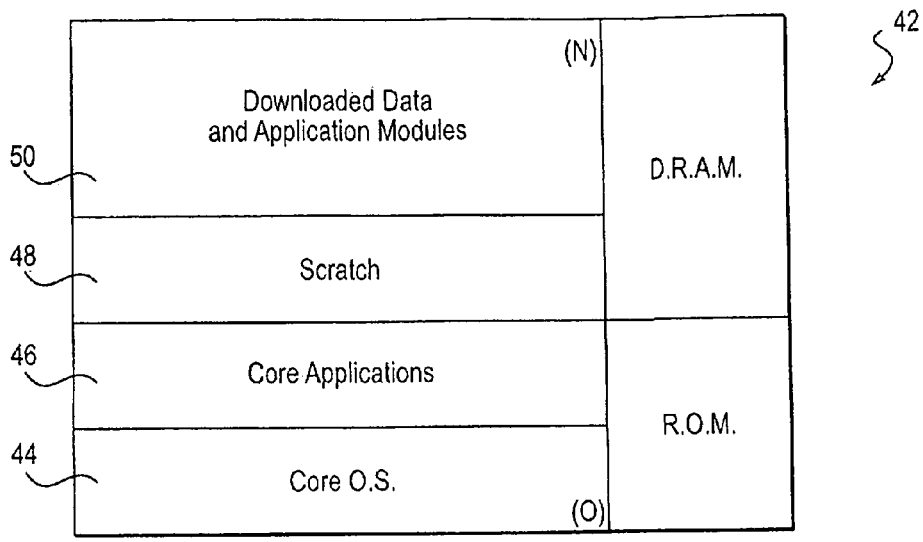
FIG. 3 is a memory map diagram for a personal computing device of the present invention.

FIG. 3 is an exemplary memory map of the memory architecture for a personal computing device 14 of the present invention. In this example, the lower portions of memory are stored in ROM, while the upper portions of memory are stored in DRAM. However, those skilled in the art will appreciated that the ROM is merely one instance of non-volatile memory, and that the DRAM is merely one instance of the read/write memory. Further, it will be appreciated to those skilled in the art that the memory map illustrated in FIG. 3 is merely illustrative in that the different memory segments can be distributed through memory, compressed, or otherwise subject to various data storage techniques well known to those skilled in the art.

In FIG. 3, the memory map 42 includes a core operating system (OS) 44 stored in the lower addresses of the ROM, and certain core applications 46 stored in higher memory locations of the ROM. The core operating system provides the base functionality for the personal computing device 14 and handles such operations as input and output to the personal computing device, interfacing to the various peripheral devices of the personal computing device, managing the memory function, and other functions of operating systems well know to those skilled in the art. The core applications 46 are also preferably stored in a non-volatile store such as the ROM and can include basic applications such as a calendar, an address book, a to do list, etc. Another possible core application 46 is an extension operating system which provides the functionality to communicate with the service agent server 16 in accordance with the present invention. However, preferably, this functionality is built into the core operating system 44.

The DRAM portion of the memory map 42 preferably includes a scratch area 48 which can be used by the operating system and/or application programs and downloaded data and application modules in a portion 50. Again, the memory map of FIG. 3 is conceptual or functional in nature and the actual location of the data can be distributed within the DRAM in accordance with a number of memory system methodology. In this exemplary implementation, the various segments of memory are shown to be in discrete blocks sorting with low memory (0) for the core operating system and high memory (N) for the downloaded data and applications. It should be noted that multiple application modules can be downloaded into the personal computing device 14 and stored in the memory location 50. If multiple modules are downloaded, at least one of the multiple application modules can also include expansion operating system code segments to permit other application modules to execute upon the personal computing device 14.

Figure 4:
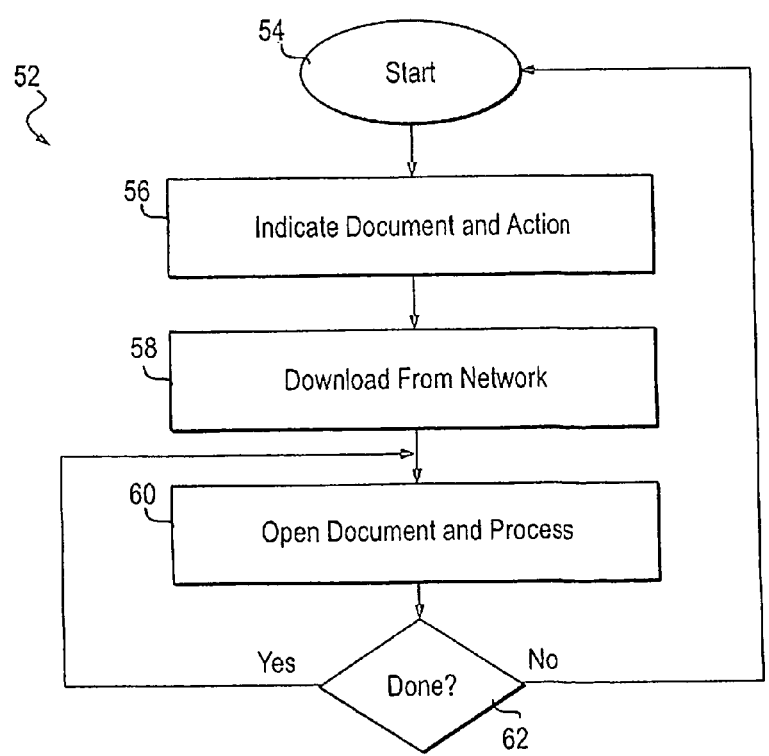
FIG. 4 is a flow diagram of the process implemented by a personal computing device of the present invention.

In FIG. 4, personal computing device process 52 in accordance with the present invention is illustrated as a flow diagram. This process 52 is a computer implemented process operating on the PDA or other personal computing device. 52 begins at 54 and, in an operation 56 a user indicates a document that he or she wishes to use and an action that he or she wants to perform with respect to that document. For example, the document can be a text or word processing file, or a graphics or a pdf type file, and the action may be to "view", "edit", "rename", etc. Next, in an operation 58, the document and the application module or modules required to perform the desired actions are downloaded from the network 12. Next, in an operation 60, the document is "opened" and processed in accordance with the desired action. A decision step 62 determines whether the user is completed with the action on the retrieved document and, if not, operational control continues to remain with operation 60. If the action has been completed, operational control returns to operation 56 where the user can indicate an additional document and action and repeat the process 52.

Figure 5A:
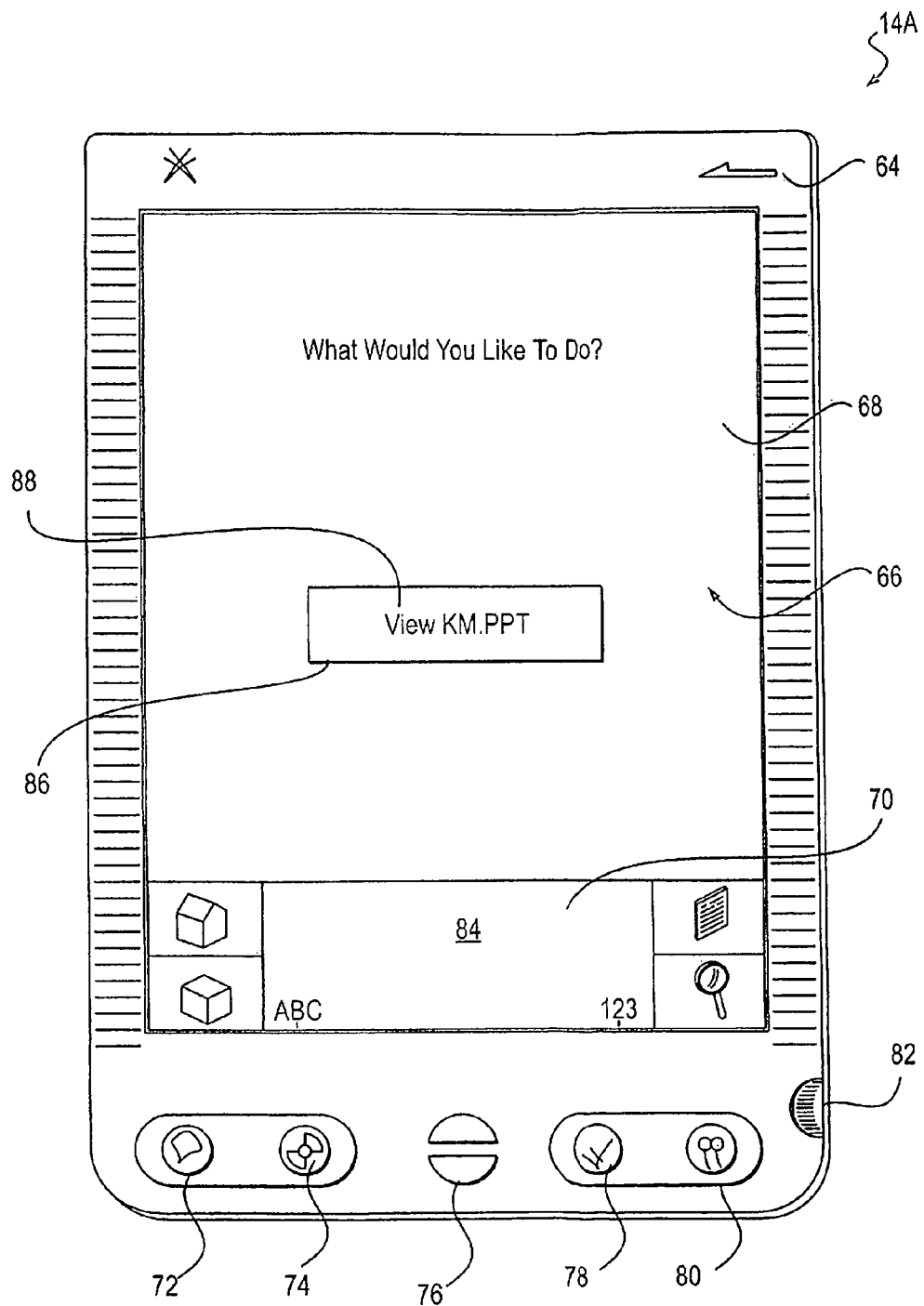
FIG. 5a is a top plan view of a PDA that is used to describe the functionality of the indicate documents and action process of FIG. 4.

In FIG. 5a, a personal computing device 14a is illustrated. This personal computing device 14a is preferably a PDA using the Palm operating system. Of course, other operating systems can be used such as Windows CE from the Microsoft Corporation. The PDA 14a includes an enclosure 64 having a pressure sensitive membrane area 66 which covers a display 68 and an input area 70, as well as a number of switches 72, 74, 76, 78, and 80. The PDA 14a is powered on and off by a power switch 82. A number of the switches or buttons 72-80 are used to access core applications stored in the core application portion of the RAM 46 (see FIG. 3). They include, for example, an address book, a calendar, a to do list, etc. The input area 70 is simply the pressure sensitive membrane 66 overlying in areas of the PDA that are provided with a number of icons and a writing area 84. The writing area can be used to enter alphanumeric information into the PDA 14a either by character recognition, or by the use of a specialized alphabet such as graffiti. Alternatively, a keyboard can be caused to be displayed in the display area 68 for the entry of alphanumeric data, for example.

The display area 68 is preferably, for example, a liquid crystal (LCD) display. In this instance, the display is displaying the question "what would you like to do?" The display is also provided with a dialog box 86 into which the user can enter an alphanumeric string 88 which, in this example, is "view km.ppt". This alphanumeric string is entered as previously described in the writing area 84, by popping up a virtual keyboard or keypad, and by other techniques that are well know to those skilled in the art. This alphanumeric string 88 includes a document that the user wishes to perform an action on, and the desired action. In this example the document that the user wishes to perform the action on is "km.ppt" and the action is "view". This entry of the alphanumeric string 88 is an example of the indicate document and action operation 56 of FIG. 4.

Figure 5B:
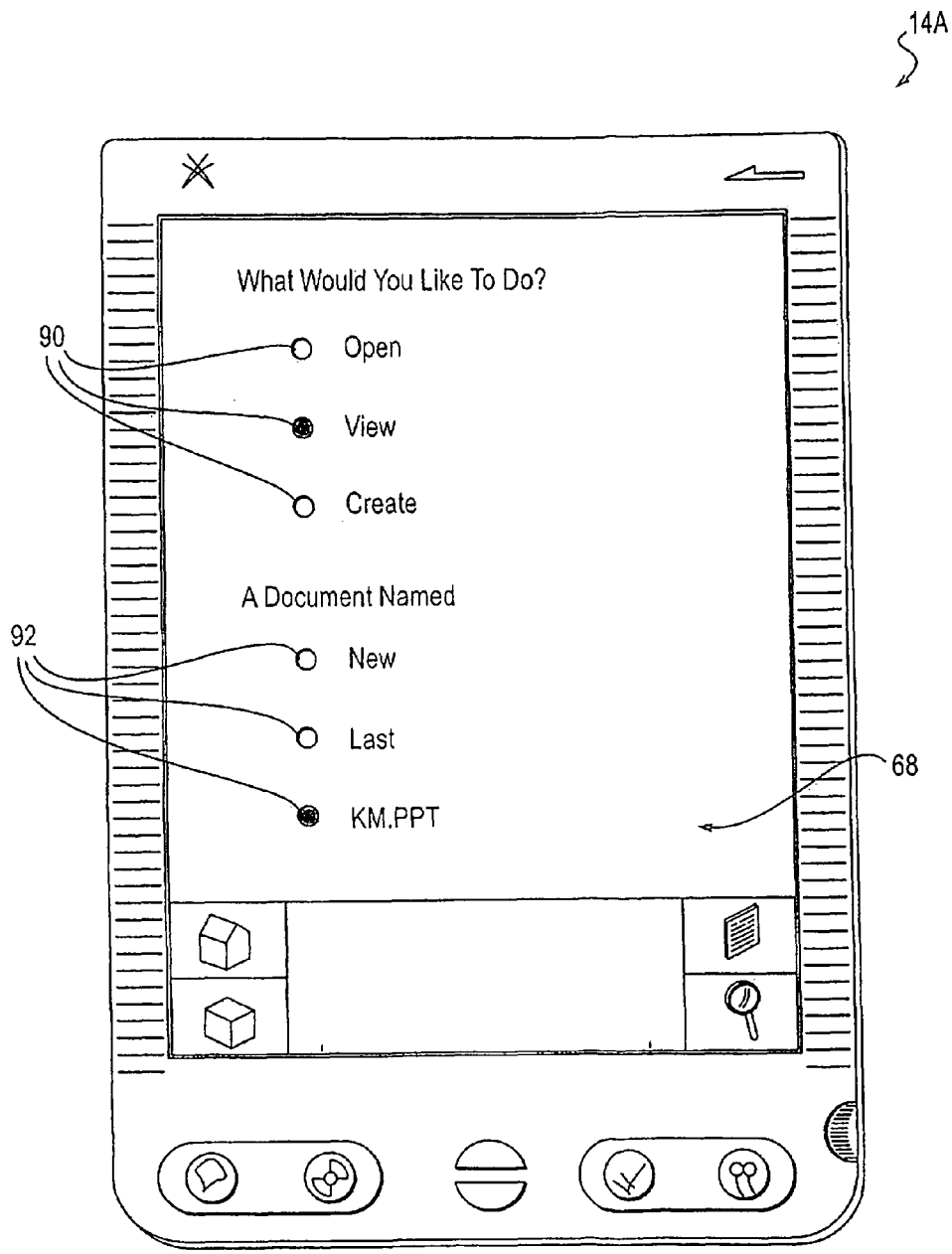
FIG. 5b is a top plan view of a PDA illustrating an alternative methodology for indicating documents and actions in the flow diagram of FIG. 4.

FIG. 5b is a top plan view of a PDA 14a which illustrates and alternative method for indicating documents and actions in the operation 56 of FIG. 4. In this example, the liquid crystal display in viewing area 66 provides a "radio button" or list-type interface to allow a user to indicate a document and an action to be performed on the document. More particularly, the liquid crystal display displays the question "what would you like to do?" and provides a list with radio buttons 90 that allows the user to select between "open", "view", and "create". This defines the desired action. The liquid crystal display in viewing area 68 also displays "a document named" and a list of documents with associated radio buttons 92. The documents named can be "new", "last", or "km.ppt." It should be noted that the information for the particular user can be stored on either the PDA 14a, but more preferably on the service agent server's database so that the user can access his or her documents from any available personal computing device, that is, personal information about a particular user is preferably stored on the network such that any generic personal computing device 14 can be used to access the user's documents and other data. In this example of FIG. 5b, the action collected is "view" and the document is indicated to be "km.ppt", i.e. the action and object designated in the example of FIG. 5b is exactly the same as the action and object designated in a different fashion in the embodiment of FIG. 5a.

Figure 6:
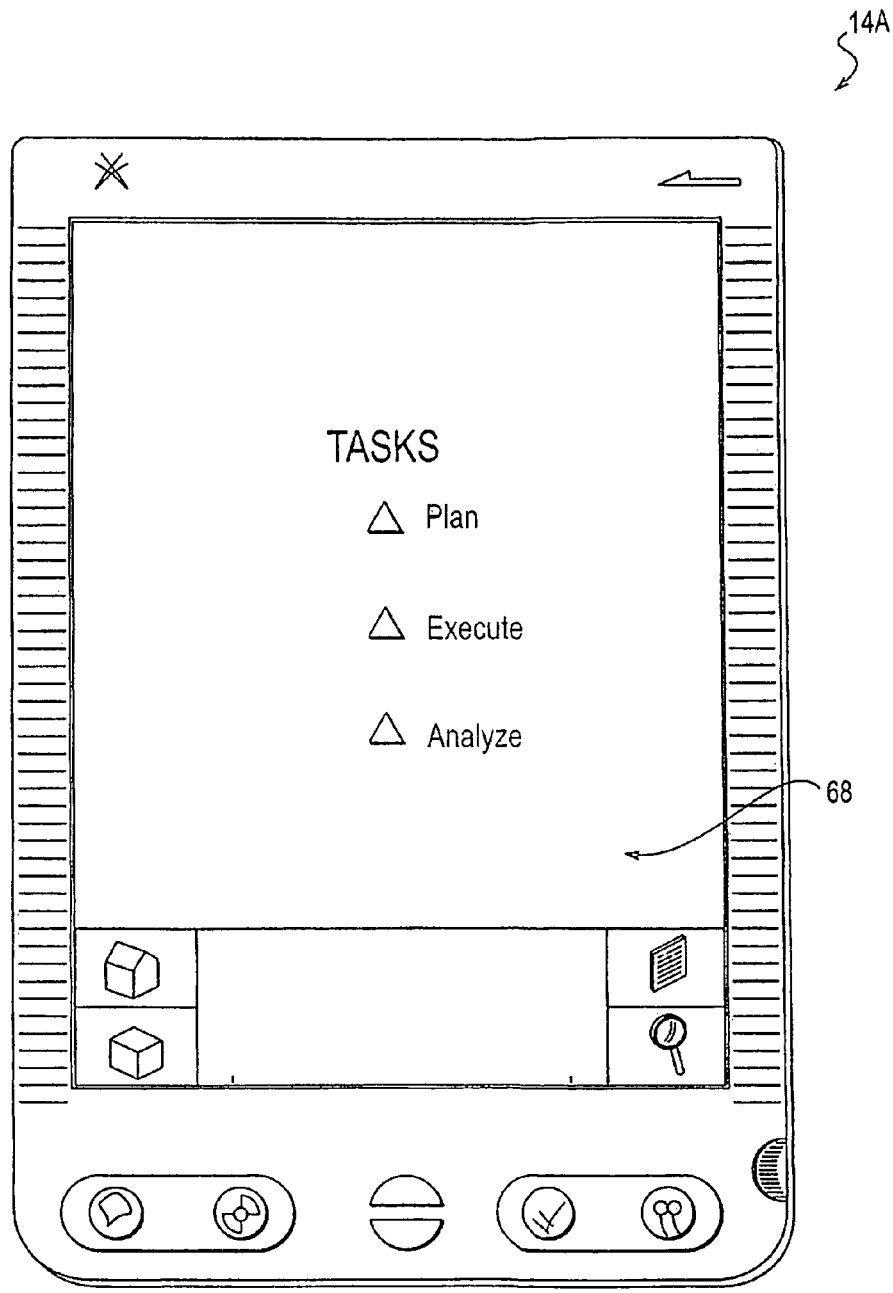
FIG. 6 is a top plan view of a document that has been downloaded and opened by a downloaded application module of the present invention.

FIG. 6 illustrates the results of indicating the document in action, and downloading it from the network. That is, it is an illustration of operation 60 "open document and process" of FIG. 4. In this example, the action is to view the power point slide of document km.ppt. This power point slide has a heading of tasks and subheadings of plan execute and analyze. Since the operation is to view, only the application module required to view the power point slide is downloaded from the network in the operation 58. If the user had designated a different action, such as "edit", a different or additional application module would also be downloaded from the network in step 58 of FIG. 4.

Figure 7:
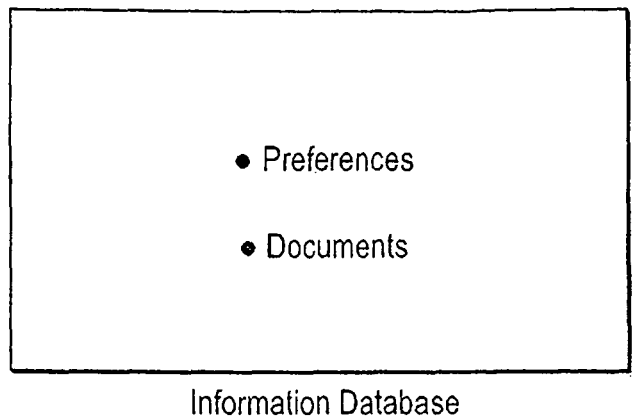
FIG. 7 is an illustration of the information database of the present invention.

FIG. 7 is a conceptual illustration of an information database of the present invention. This information database can, for example, be stored in the personal information database and document store 18 in FIG. 1 and/or in another database such as the personal information database and document store 22 of FIG. 1. The information database preferably includes at least two types of information, namely, user preferences, and user documents. Again, the documents and preferences can be stored physically in a single server or database, or can be distributed elsewhere on the network 12. The user preferences include such information as which documents belong to the user, which document was last used, and which application modules were used in conjunction with those documents. The documents themselves can be of virtually any type including text, special word processing, spread sheets, presentations, and other types of documents well know to those skilled in the art. By storing user preferences and user documents on the network 12, they can be accessed by the user virtually anywhere in the world. That is, as long as the user has a generic personal computing device 14 which can at least part time couple to the network 12, he or she can retrieve documents and have user preferences customize the interface and interaction with the service agent server 16.

Figure 8:
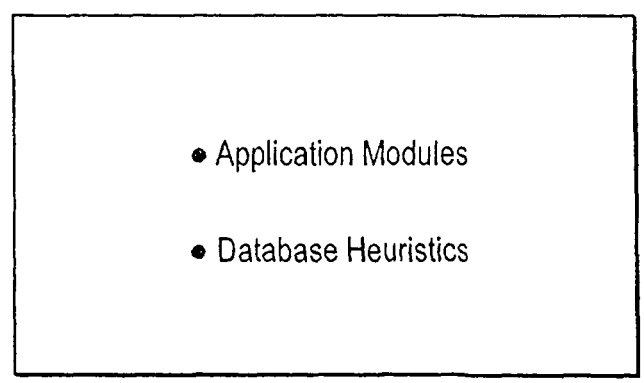
FIG. 8 is an illustration of a software database of the present invention.

FIG. 8 illustrates a software database in accordance with the present invention. This software database can include application modules and a heuristic database which aids in the selection of application modules for a particular user and for a particular user document. Again, the software database can be integrated or distributed in various servers and locations on the network 12. For example, this software database can be found in application module store 20 or, can be provided by third party vendors in application module store 24.

The application modules are portions of larger application programs which have been divided down to the essential elements required to perform a particular act. For example, with a word processing application, it can be broken down into a variety of modules which allows, for example, only viewing a document, viewing and editing a document, providing graphical input to a document, etc. By dividing these large application programs, which typically require a personal computer and a disk operating system, into smaller application modules allows the documents to be acted upon in much lower power devices such as the PDA 14*a*. These application modules are preferably designed by the application developer for this purpose. However, since many modern applications are physically created by the combination of dynamically linked libraries (DLLs), it is also possible for the end user to designate which dynamically linked libraries are required to perform a specific action such that only those dynamically link libraries are downloaded to the rather limited memory and computational power of the personal computing device 14*a*. However, it should be noted that this methodology is also useful in a local area network computing environment. For example, a worker at his or her terminal may only occasionally need to perform an action on a particular type of document. For example, an executive may only want to view or edit a power point slide presentation perhaps once a year, making it inefficient to buy and load an entire power point application on his computer system using the methodology of the present invention. The necessary modules required to view or edit the power point presentation can be downloaded from a central server, perhaps provided by an intranet or Novell local area network, to allow the executive to perform the desired but very occasional action.

The software database of FIG. 8 also preferably includes database heuristics which will be discussed in greater detail subsequently. Briefly, the database heuristics are used by a heuristic process running on the service agent server 16 to select the necessary application modules required to perform the desired action on the requested document. These heuristics can range from the very simple to the complex, including expert system and artificial intelligence methodologies.

Figure 9:
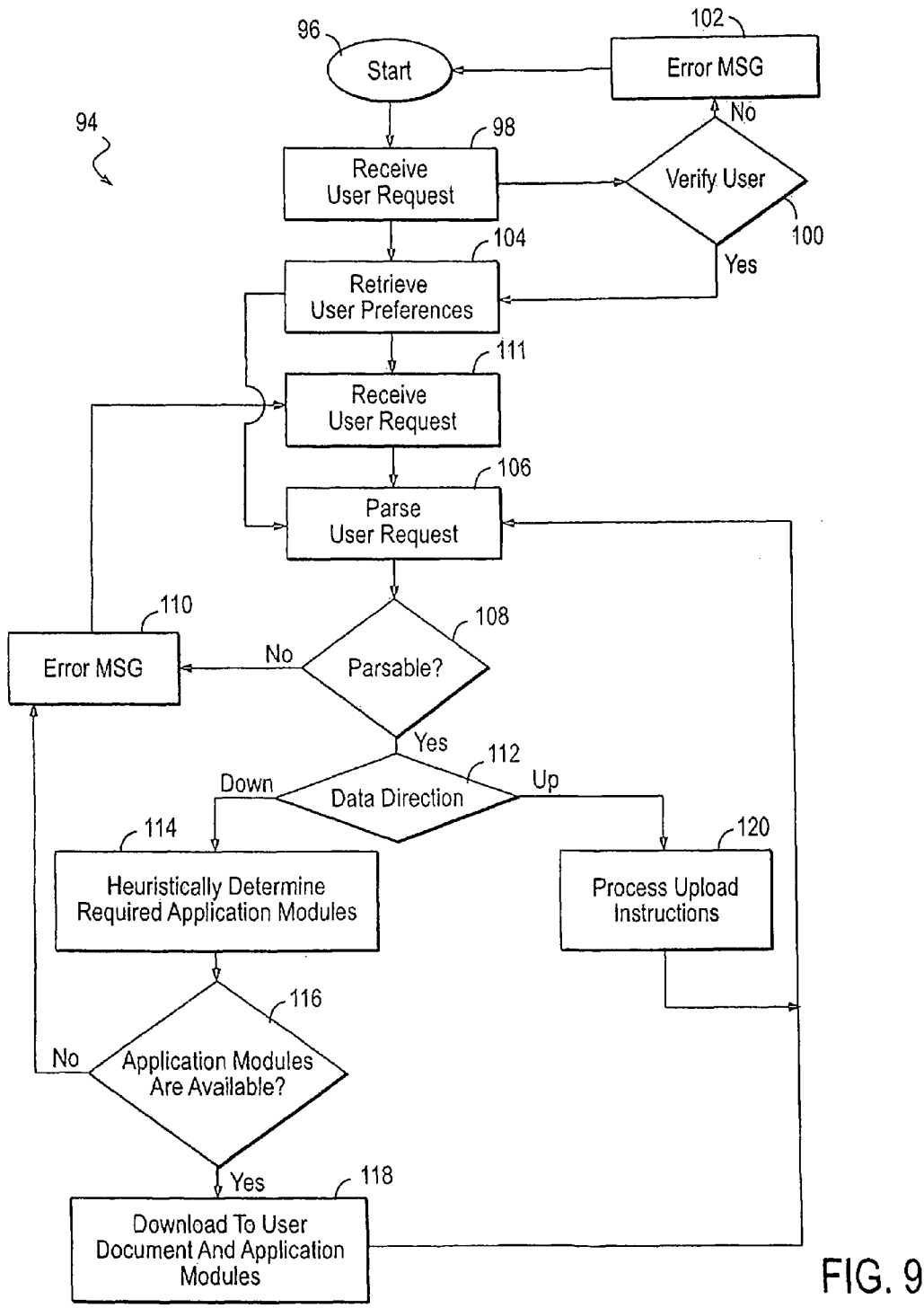
FIG. 9 is a flow diagram of the functionality of the service agent server of the present invention.

In FIG. 9, a process 94 for implementing the functionality of the service agent server 16 is illustrated in flow diagram form. The process 94 begins at 96 and, in operation 98, a user's request is received, an operation 100 verifies the user and, if the user can not, be verified, an error message is provided in an operation 102 and process control is returned to 96. If the user can be verified in operation 100, user preferences are retrieved in an operation 104 and operation 106 parses or attempts to parse the user's request. If operation 108 determines that the request is not parsable, an error message is provided in operation 110 and a new user request is retrieved in an operation 111. The new user request is then parsed in operation 106 to repeat the process.

When a parsable request has been received, an operation 112 determines the direction of data flow. That is, the operation 112 determines whether the data is flowing to the service agent server from a personal computing device or is flowing from the service agent server to a personal computing device. If the data is flowing "down", i.e. information is to be downloaded to a personal computing device 14, an operation 114 heuristically determines the required application module or modules that are to be downloaded to the personal computing device 14. Next, an operation 116 determines whether the application modules are available. If they are not available, then an error message is provided by operation 110 and a new user request is obtained to operation 111. If the application modules are available, an operation 118 downloads the application module or modules to the user along with the requested document. Process control then returns to operation 106.

If the data direction is up, i.e. information is to be transferred from the personal computing device to the service agent server 16, an operation 120 processes the upload instructions. These upload instructions can include the request to store a modified document into the document and personal information database 18, and it can include personal information such as what was the last document that was acted upon and what application modules were downloaded for the action. Process control then again returns to operation 106.

Figure 10A:
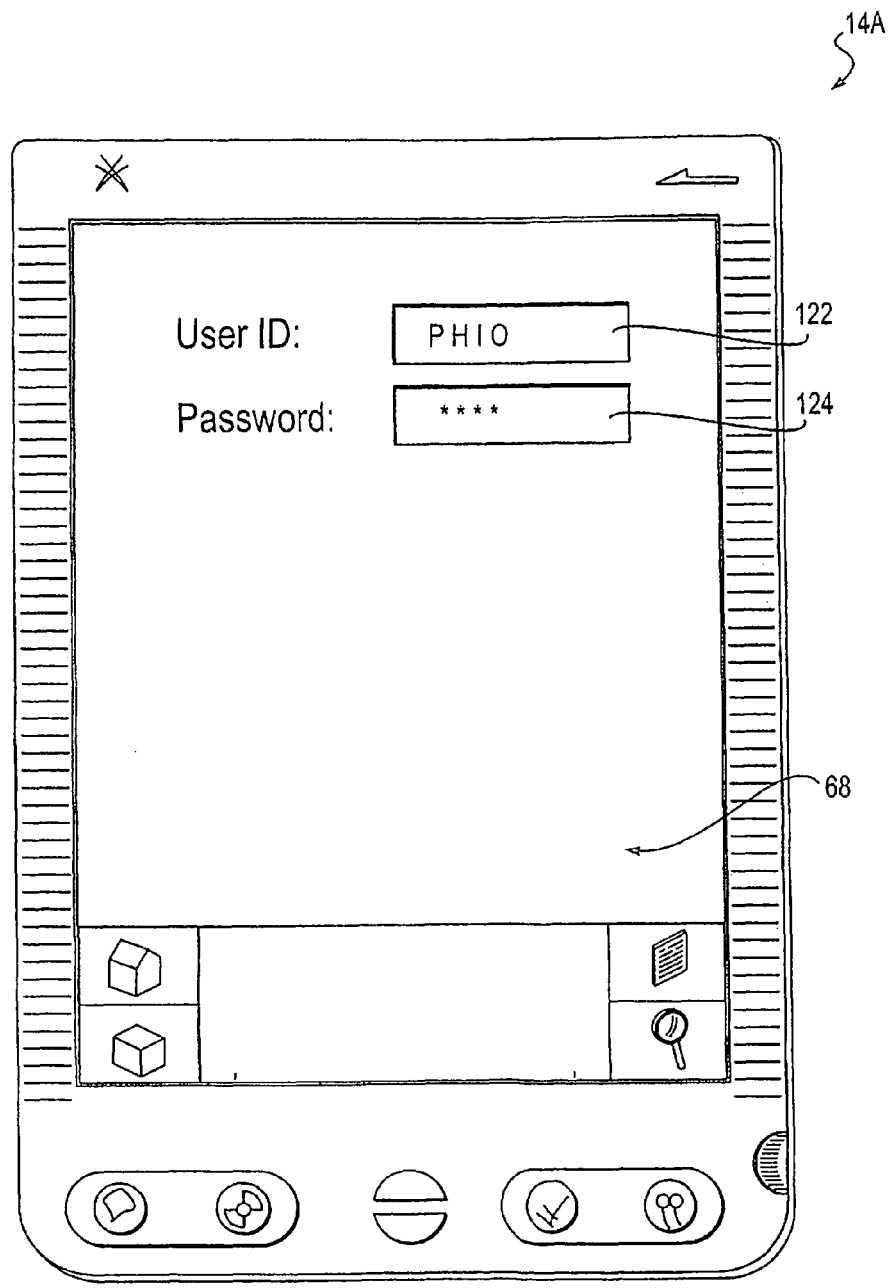
FIG. 10a is a top plan view of a PDA illustrating a first methodology for performing the verify user process of FIG. 9.

In FIG. 10*a*, the PDA 14*a* has in its display are 68 a display which illustrates a method for user identification. More particularly, the PDA 14*a* displays a pair of input boxes 122 and 124 into which a user ID and a password, respectively, can be entered. In this example, the user ID is PH10 and the password is represented by four asterisks. By having both a user ID and a password which is preferably only known to the user, the identity of the user can be established.

Figure 10B:
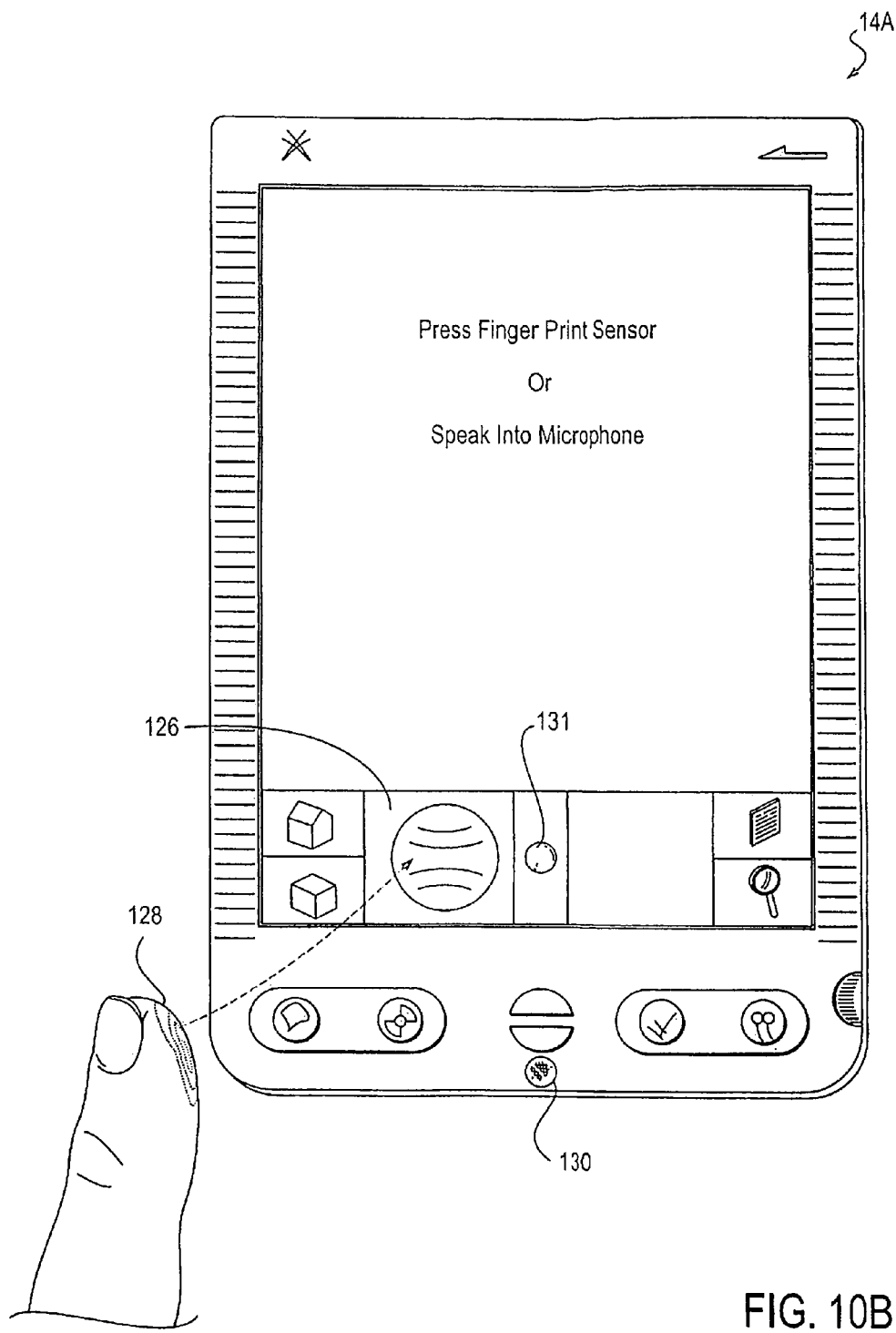
FIG. 10b is a top plan view of a PDA illustrating an alternative methodology for accomplishing the verify user process of FIG. 9.

FIG. 10*b* illustrates several alternative methodologies for identifying a user. In this example, the PDA 14*a* is provided with a fingerprint recognition device 126 which can recognize the fingerprint 128 of a user. The design and manufacture of fingerprint recognition devices are well known to those skilled in the art. Alternatively, a user can speak into a microphone 130 such that voice recognition and verification can be accomplished. If the personal computing device is equipped with a CCD camera 131, then the camera can transfer the user's facial image or retina image to the service agent server for image recognition. It will therefore be appreciated from the foregoing discussions and the illustrations of FIGS. 10*a* and 10*b* that there are a wide variety of methodologies for identifying a user in a secure and accurate fashion.

Figure 11:
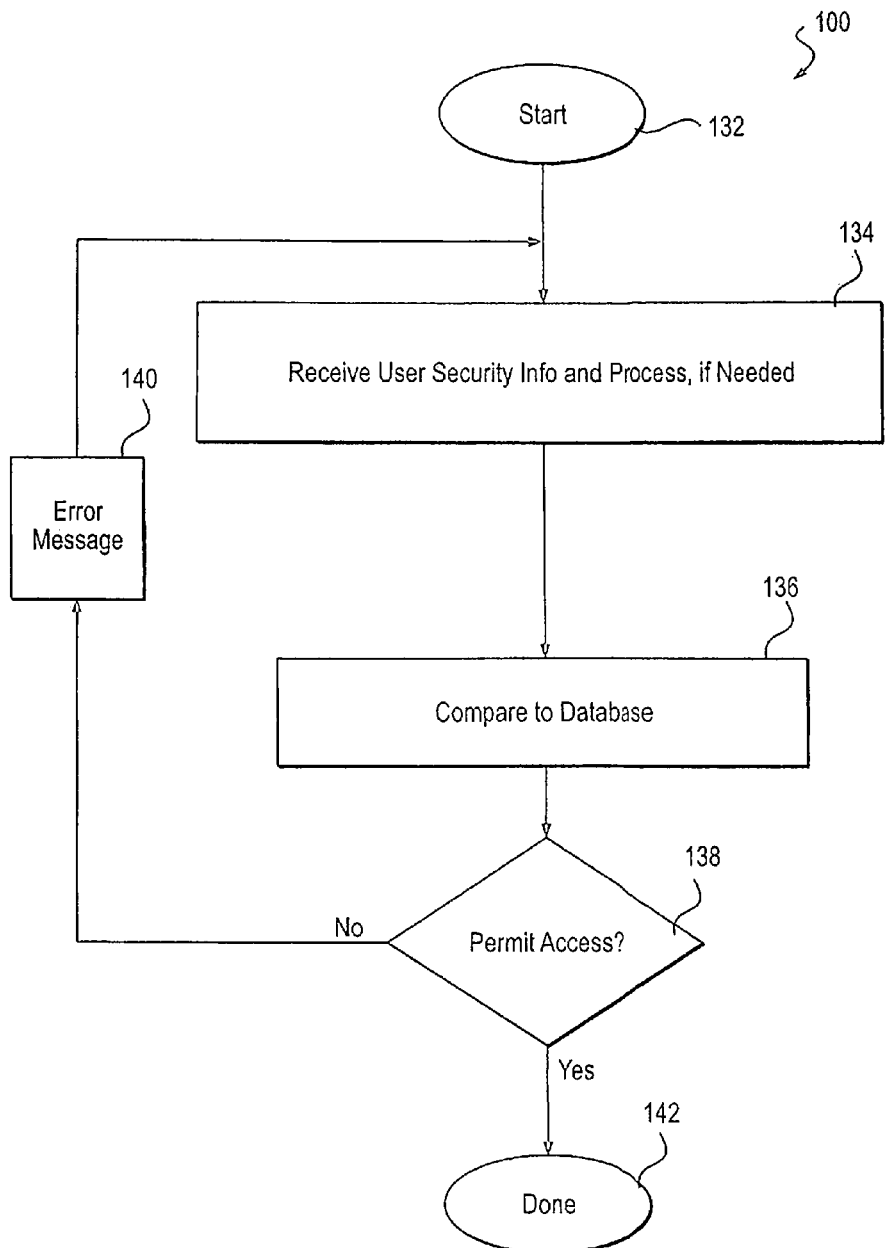
FIG. 11 is a flow diagram illustrating the verify user process of FIG. 9.

FIG. 11 illustrates the verify user operation 100 of FIG. 9 in greater detail. More particularly, operation 100 begins at 132 and, in operation 134, the service agent server 16 receives user security information and processes if the system requires this, that is, in some implementations of the present invention the security process is not required and is eliminated. However, preferably, the user is identified in the security operation 134. Typically, the security information will have to be processed in some fashion, e.g. the information may have to be parsed, or the voice recognition input will need to be recognized, or the fingerprint recognition will have to be performed, etc. However, portions of this processing can be performed on the personal computing device 14 itself prior to the receipt of the user security information in operation 134.

Next, in operation 136, the user security information (which may or may not have been processed) is compared to a database of security information. For example, the database may include a matrix of user IDs and passwords for this comparison purpose. A decision operation 138 determines whether access should be permitted. For example if the password matches the user ID, then access will be permitted. If the password did not match the user ID then an error message 140 would be generated and new user security information will be received in an operation 134. In other examples, access will be permitted when the voice print of the user matches voice print criteria stored in the database 136, fingerprint criteria match fingerprint criteria stored in the database 136, etc. If access is permitted, then the operation is completed at 142.

Figure 12:
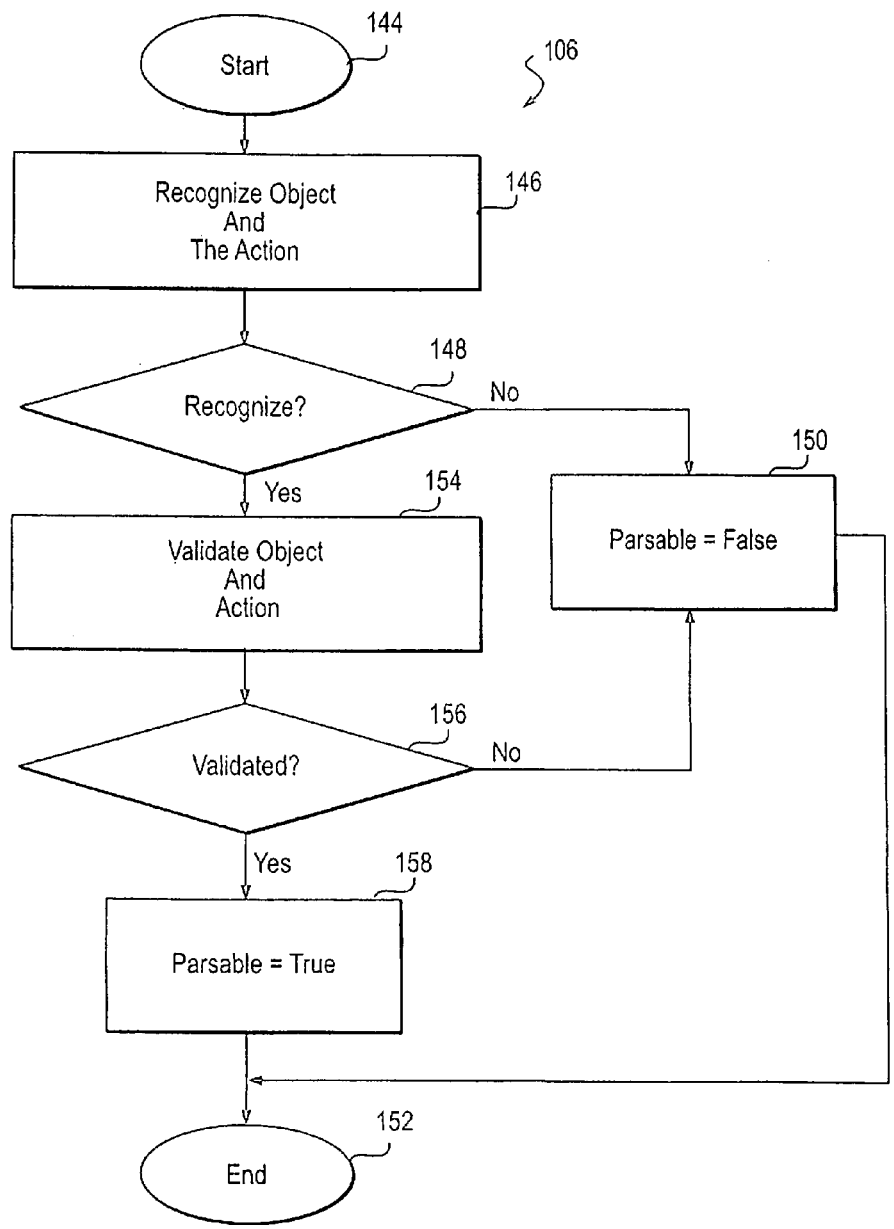
FIG. 12 is a flow diagram of the parse user request process of FIG. 9.

FIG. 12 is a flow diagram illustrating the parse user request operation 106 of FIG. 9 in greater detail. The process 106 begins at 144 and, in an operation 146, the object and the action are recognized. In the present terminology, the object is the document upon which an action is to be taken. Next, in an operation 148, it is determined whether it recognizes an object and an action. If not, an operation 150 sets the flag "parsable" to false. This flag is used in an operation 108 to determine whether the user request was parsable. If the object and the actions are recognized, an operation 154 validates the object and the action. If the object and the action can not be validated, operation 150 again sets the flag parsable to false. Otherwise, the validated object and action causes operation 158 to set the parsable to true. The process is then completed at 152.

Figure 13A:
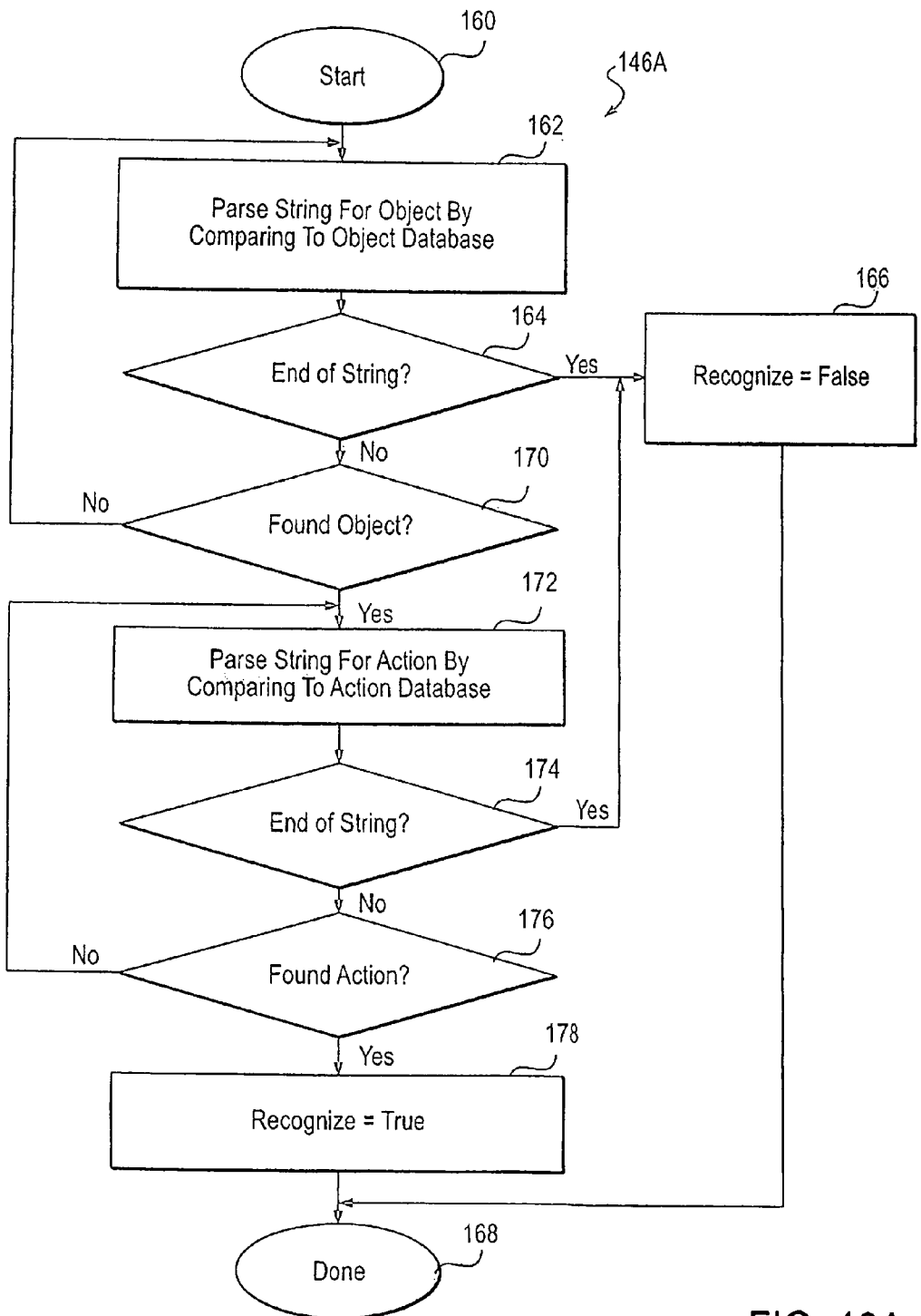
FIG. 13a is a flow diagram of the recognized object and action process of FIGS. 5a and 12.

FIG. 13*a* illustrates the operation 146 of recognizing the object and the action of FIG. 12 in greater detail. This process 146*a* parses an alphanumeric string to look for objects and actions. The process 146*a* begins at 160 and, in a step 162, the string input by the user into, for example, the dialog box 86 in FIG. 5*a* is parsed by comparing the string to an object database. Techniques for parsing are well known to those skilled in the arts. A simple parsing scheme compares objects in the object database to sequential combinations of the alphanumeric string until a match is found. An operation 164 determines if they have reached the end of the string, and, if so, it means that no object was found during the parsing operation of 162. In such an instance, an operation 166 sets a flag "recognize" to false and the process 146*a* is completed at 168. If the end of the string has not been encountered as determined by operation 164, an operation 170 determines whether it found an object. Again, this is accomplished by comparing an object database of all possible objects to the string position. If an object has not been found, operational control is returned to operation 162 and, if it has been found, an operation 172 starts a similar parsing operation although in this instance the parsing operation is looking for an action, that is operation 172 parses the strings for an action by comparing it to an action database. An operation 174 determines if it is at the end of the string and, if so, operation 166 sets the recognized flag to false and the process is again completed at 168. If the end of the string has not been encountered, an operation 176 determines whether an action has been found and, if not, process control is returned to operation 172 to further parse the string. If an action has been found, then the flag recognized is set to true in an operation 178 and the operation is complete at 168. The recognized flag is used in the operation 148 of FIG. 12 to determine whether a recognition of an object and action is possible.

Figure 13B:
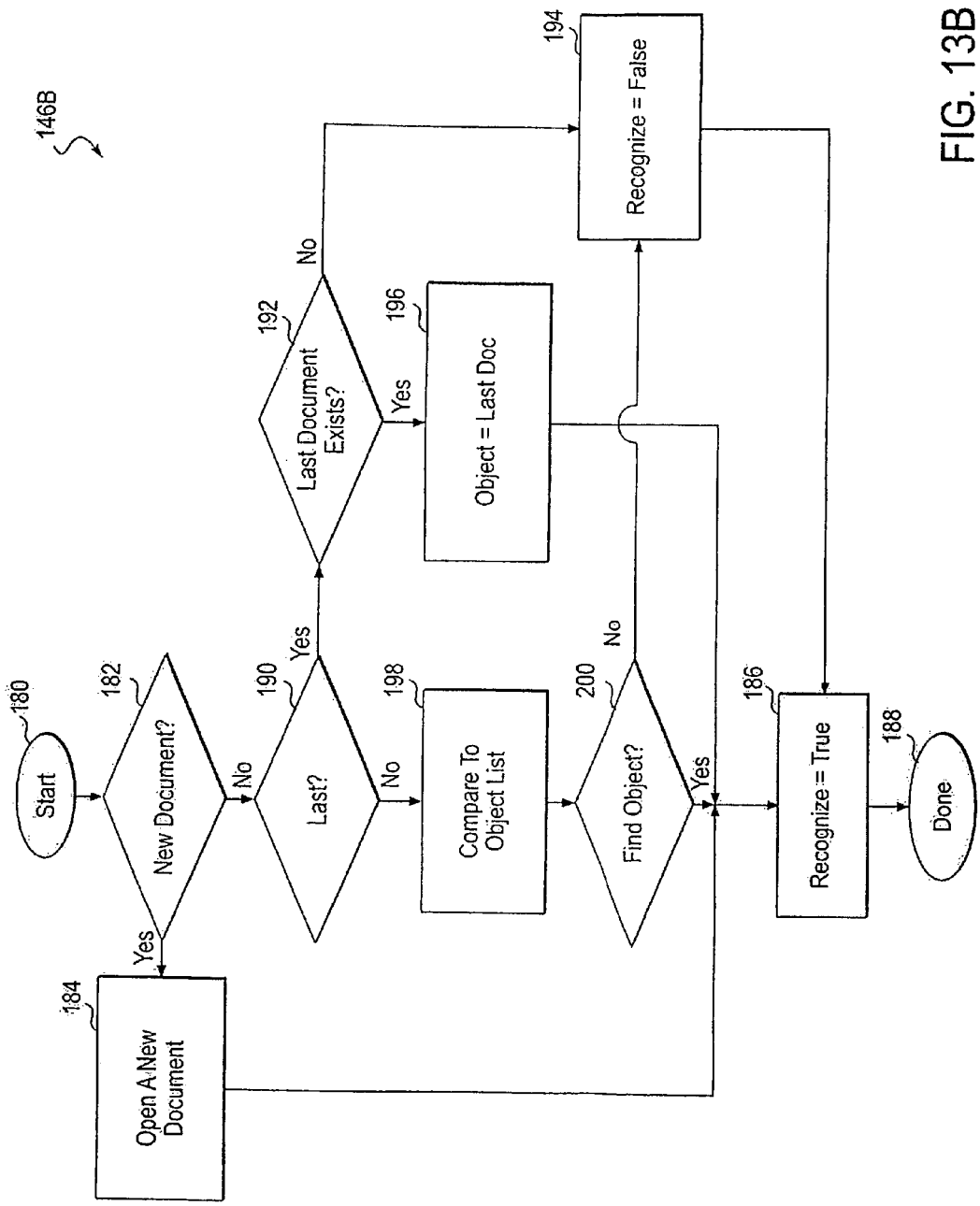
FIG. 13b is a block diagram illustrating an alternative methodology for the recognized object and the action process of FIGS. 5b and 12.

FIG. 13*b* illustrates another implementation of process 146 of FIG. 12. In this case the user makes selections from a provided list of choices, as illustrated in FIG. 5B. More particularly, the process 146*b* begins at 180 and a decision operation 182 determines whether it is a new document. If it is a new documents, an operation 184 opens a new document and an operation 186 sets a flag "recognized" to true. The process 146*b* is then complete at 188.

If operation 182 determines that it is not a new document, an operation 190 determines whether it is the last document that is being requested as the requested document. If it is, an operation 192 determine whether the last document exists. This is typically accomplished by going to a lookup directory or database to indicate the storage address of the last document, and then verifying that that document is in the specified location. If the last document does not exist (or if the process simply can not find the last document) an operation 194 sets the flag "recognized" to false and the process 154 then again terminates at 188. If the last document is determined to exist by operation 192, the object is set to the last document in an operation 196 and operation control is turned over to 186 to set the recognized flag to true.

If the operation 190 determines that it is not the last document that is being requested, it is compared to an object list or database in an operation 198. If the object is found in the list and found at the designated storage location, then the recognized flag is set to true on operation 186, and if the object is not found by operation 200, then the recognized flag is set to be false in operation 194.

Figure 14:
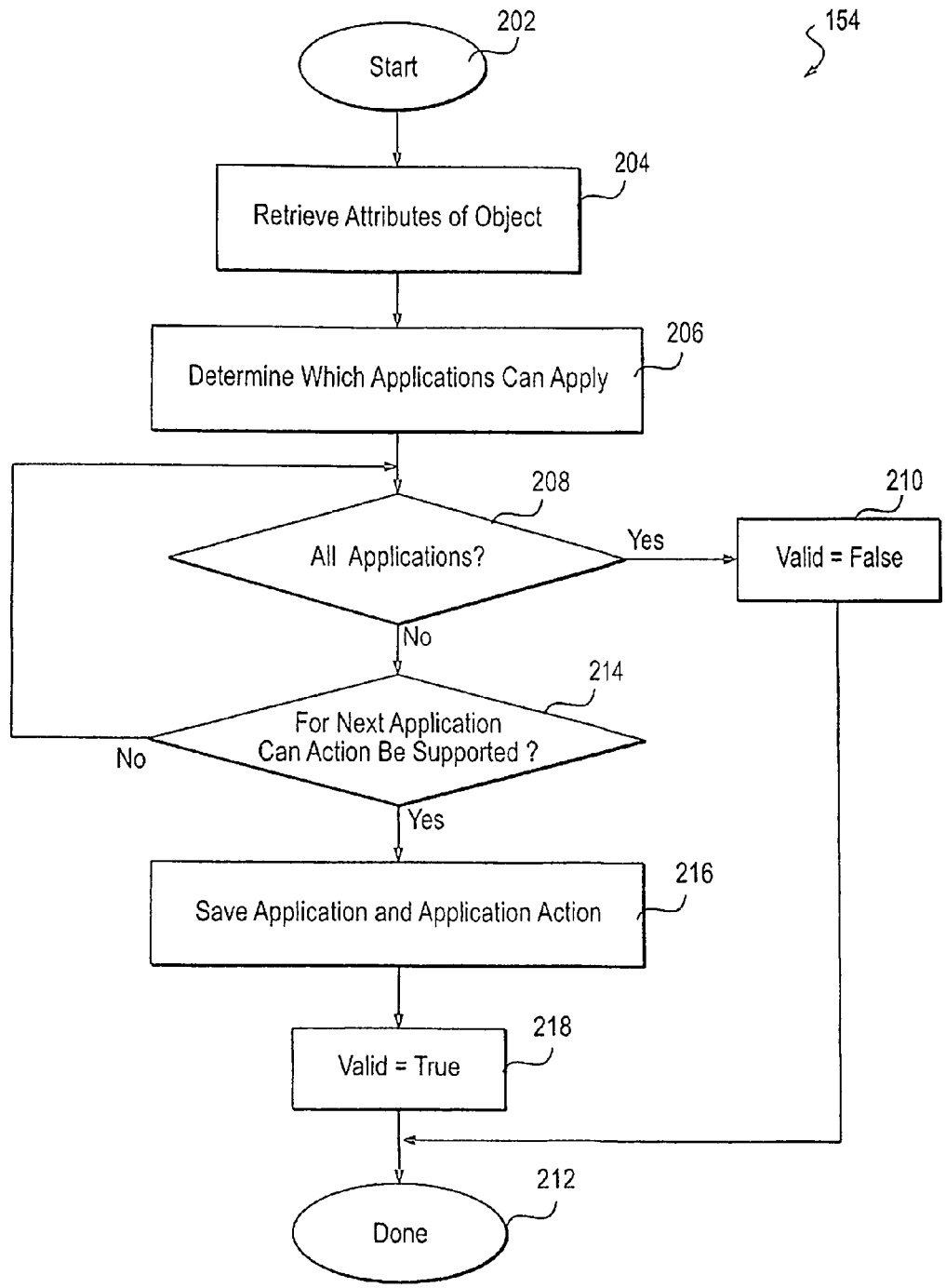
FIG. 14 is a flow diagram of the validate object and action process of FIG. 12.

FIG. 14 illustrates the process 154 "validate object and action" of FIG. 12 in greater detail. Process 154 begins as 202 and, in an operation 204 the attributes of the object are retrieved. While there are a number of ways of portraying attributes of an object, a very common method known to those skilled in the art is to use the suffix of the file name to indicate its attribute. For example, the suffix .txt is used to indicate a text file. The suffix .pdf is used to indicate a pdf or acrobat type file. The suffix .doc is typically used to indicate a Microsoft Word word processing file. Attributes can also be determined by parsing file headers, etc. as is well know to those skilled in the art. For example, many documents have an associated properties table which can be used to determine the attributes of the object.

Next, in an operation 206, is determined which applications can be used to perform the desired action on the requested object or document. This is typically accomplished by going through an ordered list of application programs which might apply to that objects attributes. An operation 208 determines whether all applications which could apply have been checked, and if so, then a flag "valid" is set to false and an operation 210 to indicate that it was not possible to validate the ability to perform the requested action on the requested document or object. Operation control then turns to 212 to complete the process 154. If not applications on the list have been analyzed, an operation 214 determines whether the next application can support the desired action on the object or requested document. If not, an additional application is compared and operation control is returned to operation 208.

If operation 214 determines that an action can be supported by a particular application, an operation 216 saves the application in an application action and an operation 218 sets the valid flag to true. The process 154 is then completed at 212.

FIG. 15 illustrates a heuristic database which matches actions and attributes to desired application modules for a given application. For example, for a particular action "(1)" there may be multiple attributes that can be associated. For example, the action "view" could apply to a text document, a pdf document, or a power point document. For a particular action and attribute the heuristic table of FIG. 15 lists one or more application modules that are required to support the desired action. Preferably, the minimum number of modules required to support the action are specified to minimize the download to the personal computing device and to minimize the resources required on the personal computing device to perform the desired action on the requested document.

As used herein the terms "object" and "document" and "requested document" have been used somewhat synonymously. As will be appreciated by those skilled in the art, an object is a generic term which can include a related set of data, executable code segments, or both data and executable code segments. Therefore, an object can also refer to the application modules that are downloaded with the requested documents.

Figure 16:
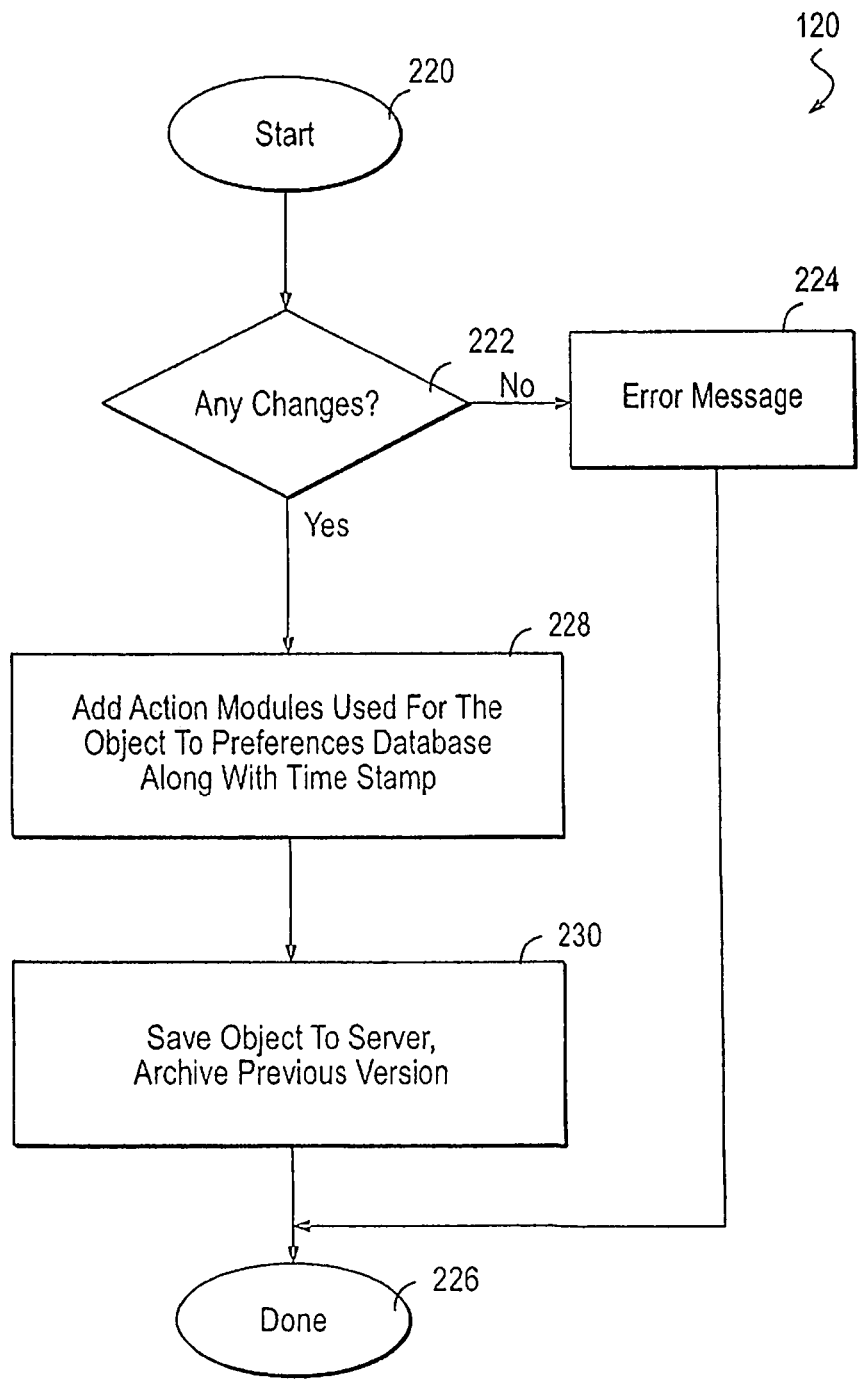
FIG. 16 is a flow diagram of the process upload instructions process of FIG. 9.

FIG. 16 illustrates the operation 120 "process upload instructions" of FIG. 9 in greater detail. Process 120 begins at 220 and, in an operation 222, is determined if any changes have been made to the requested document. If not, an operation 224 indicates that an error has occurred and the process is completed at 226. If changes have been made, an operation 228 adds the modules used for the object (aka document) to the preferences database along with a time stamp. This preference database may, for example, be stored in databases 18 and/or 22 depending upon the physical implementation of the present invention. Next, in an operation 230, the object or document is saved to the server, e.g. to server 20 or server 24 of FIG. 1. The process is then complete at 226.

The present invention has been described with references to several preferred embodiments. It will be appreciated by those skilled in the art that various alternations, modification, and equivalents to the described embodiments are within the spirit and scope of the present invention. It is therefore intended that the following appended claims include all such alternations, modifications, and equivalents all fall within the true spirit and scope of the present invention.

What is claimed is:

1. A personal computing device comprising:
a digital processor;
non-volatile memory coupled to said digital processor and including a core operating system;
a wireless network communication port coupled to said digital processor operative to send a request to a network server over a global network for a selected portion of a requested object or document that was not locally stored on said personal computing device and an action to be performed on said selected portion of said object or document; and
read/write memory coupled to said digital processor and operative to receive only said selected portion of said requested object or document and only one application module that was downloaded by said network server to said personal computing device to perform said action on said selected portion of said requested object or document responsive to said request;
wherein said selected portion of a requested object or document is less that an entirety of said requested object or document and wherein said one application module is one of a plurality of application modules comprising an application program capable of performing a plurality of actions on said requested object or document; and
wherein said network server determines said one application module responsive to one or more attributes of said selected portion of said requested object or document.

2. A personal computing device as recited in claim 1 wherein said core operating system includes components which facilitate the uploading of requests by said personal computing device and the downloading of selected portions of objects or documents and application modules to said personal computing device.

3. A personal computing device as recited in claim 1 further comprising an extension operating system which works in conjunction with said core operating system to facilitate the uploading of requests by said personal computing device and the downloading of selected portions of objects or documents and application modules to said personal computing device.

4. A personal computing device as recited in claim 1 wherein said read/write memory includes a plurality of application modules, and wherein at least one of said plurality of application modules includes an operating system emulator which can be used by at least one other of said application modules.

5. A personal computing device as recited in claim 2 wherein said core operating system further includes components for uploading personal information from said personal computing device.

6. A personal computing device as recited in claim 2 further comprising an extension operating system which works in conjunction with said core operating system which includes components for uploading personal information from said personal computing device.

7. A method for performing an action on an object or document on a personal computing device comprising:
indicating on a wireless personal computing device a requested object or document and an action to be performed on said object or document;
downloading to said wireless personal computing device from a network server over a global network only a selected portion of said requested object or document and only one application module used to perform said action on said selected portion of said requested object or document; and
performing said action on said selected portion of said requested object or document on said wireless personal computing device using said only one application module;
wherein said selected portion of a requested object or document is less that an entirety of said requested object or document and wherein said one application module is one of a plurality of application modules comprising an application program capable of perfo ming a plurality of actions on said requested object or document; and
wherein one or more attributes of said selected portion of said requested object or document determine said one application module.

8. A method for performing an action on an object or document on a personal computing device as recited in claim 7 wherein indicating a requested object or document includes inputting an alphanumeric string indicating the requested object or document and said action into said personal computing device.

9. A method for performing an action on an object or document on a personal computing device as recited in claim 7 wherein at least one of indicating a requested object or document and an action to be performed includes selection from a list.

10. A personal computing device comprising:
a digital processor;
non-volatile memory coupled to said digital processor and including a core operating system;
a wireless network communication port coupled to said digital processor operative to send a request to a network server over a global network for a requested object or document that was not locally stored on said personal computing device and an action to be performed on said object or document, the wireless network communication port further operative to receive in response to said request a downloaded selected portion of an object or document that was selected by said network server and a downloaded selected portion of an application that was selected by said network server, said downloaded selected portion of an application being matched to said action to be performed on said downloaded selected portion of said object or document; and
read/write memory coupled to said digital processor and operative to receive said selected portion of said requested object or document and said selected portion of an application that was downloaded by said network server to said personal computing device to perform said action on said requested object or document responsive to said request;
wherein said selected portion of a requested object or document is less that an entirety of said requested object or document and said selected portion of an application is less than an entirety of an application which can perform a plurality of actions on said object or document; and
wherein said network server determines said selected portion of an application responsive to one or more attributes of said downloaded selected portion of said object or document.

* * * * *